United States Patent
Pipho et al.

(10) Patent No.: US 10,352,255 B2
(45) Date of Patent: Jul. 16, 2019

(54) SYSTEM FOR CONTROLLING ENGINE OPERATING SPEED BASED ON OPERATING LOAD

(71) Applicant: Deere & Company, Moline, IL (US)

(72) Inventors: Michael J. Pipho, Dunkerton, IA (US); Ronnie F. Burk, Mountain Home, AR (US); Dick J. Goering, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 78 days.

(21) Appl. No.: 15/292,449

(22) Filed: Oct. 13, 2016

(65) Prior Publication Data

US 2018/0106200 A1 Apr. 19, 2018

(51) Int. Cl.
*F02D 31/00* (2006.01)
*F02D 29/02* (2006.01)
(Continued)

(52) U.S. Cl.
CPC .......... *F02D 31/001* (2013.01); *A01B 69/004* (2013.01); *A01B 69/008* (2013.01);
(Continued)

(58) Field of Classification Search
CPC ................... F02D 31/001; F02D 29/02; F02D 2200/1004; A01B 69/008; A01B 69/004; A01B 67/00
See application file for complete search history.

(56) References Cited

U.S. PATENT DOCUMENTS

| 5,868,214 A | * | 2/1999 | Workman | B60K 31/047 |
| | | | | 123/357 |
| 6,873,887 B2 | | 3/2005 | Zagranski et al. | |

(Continued)

FOREIGN PATENT DOCUMENTS

| CA | 2949935 | 12/2015 |
| WO | 2016/090208 | 6/2016 |

OTHER PUBLICATIONS

Scillieri et al., "Use of Feedforward in Idle Speed Control for a Direct Injection Spark Ignition Engine During Lean Burn," specification (2002) pp. 1419-1424, Proceedings of the American Control Conference, Anchorage.

(Continued)

*Primary Examiner* — David E Hamaoui
(74) *Attorney, Agent, or Firm* — Michael Best & Friedrich LLP

(57) ABSTRACT

A machine includes an engine and a governor operable to control an operating speed of the engine along a first droop curve such that the operating speed is a function of an operating load of the engine. The first droop curve includes a first region that defines a first slope, a second region that defines a second slope different from the first slope, and a transition point located at an intersection of the first region and the second region. The machine further includes a controller in communication with the governor. The controller is configured to determine an average operating load of the engine over a predetermined time period, adjust the location of the transition point based at least in part on the average operating load to create a second droop curve, and operate the engine based on the second droop curve.

17 Claims, 5 Drawing Sheets

(51) Int. Cl.
  *A01B 69/00*   (2006.01)
  *A01B 69/04*   (2006.01)
  *A01B 67/00*   (2006.01)

(52) U.S. Cl.
  CPC .............. *F02D 29/02* (2013.01); *A01B 67/00* (2013.01); *F02D 2200/1004* (2013.01)

(56) References Cited

U.S. PATENT DOCUMENTS

| | | | |
|---|---|---|---|
| 6,901,324 B2 | 5/2005 | Rose et al. | |
| 7,000,590 B2 * | 2/2006 | Carlton | F02D 41/1497 |
| | | | 123/357 |
| 7,908,068 B2 * | 3/2011 | Kondou | E02F 9/20 |
| | | | 701/50 |
| 8,175,790 B2 | 5/2012 | Stemler et al. | |
| 8,718,884 B2 * | 5/2014 | Hou | F02D 41/0205 |
| | | | 477/110 |
| 8,938,352 B2 * | 1/2015 | Bjernetun | B60W 10/06 |
| | | | 701/110 |
| 2010/0235066 A1 | 9/2010 | Hill | |
| 2017/0284326 A1 * | 10/2017 | Hori | F02D 41/107 |

OTHER PUBLICATIONS

EP17194810.2 Extended European Search Report dated Mar. 23, 2018 (9 pages).

\* cited by examiner

SYSTEM FOR CONTROLLING ENGINE OPERATING SPEED BASED ON OPERATING LOAD

BACKGROUND

The present disclosure relates to engine control, and more particularly to an engine control system capable of controlling the speed of an engine based on an operating load of the engine.

Engine governors are typically used to control engine speed. Some governors control the engine speed set point as a function of the load on the engine. This is commonly referred to as droop. Many vehicle applications use a positive droop function, where the governor decreases the speed set point as the engine load increases. Positive droop can provide feedback to an operator that the load on the engine is increasing and can make the engine speed control more stable. Droop functions are typically preset via either hardware or software. Such preset droop functions, however, may not be able to optimize various factors such as operator feel, engine performance, and fuel economy.

SUMMARY

In one aspect, a machine includes an engine and a governor operable to control an operating speed of the engine along a first droop curve such that the operating speed is a function of an operating load of the engine. The first droop curve includes a first region that defines a first slope, a second region that defines a second slope different from the first slope, and a transition point located at an intersection of the first region and the second region. The machine further includes a controller in communication with the governor. The controller is configured to determine an average operating load of the engine over a predetermined time period, adjust the location of the transition point based at least in part on the average operating load to create a second droop curve, and operate the engine based on the second droop curve.

In another aspect, a machine includes an engine, a sensor configured to measure an operating load of the engine, and a governor operable to control an operating speed of the engine along a droop curve. The droop curve includes a first region that defines a first slope, a second region that defines a second slope different from the first slope, and a transition point located at an intersection of the first region and the second region. The machine further includes a controller in communication with the governor and the sensor. The controller is configured to determine a variation value based on variation of the operating load over a predetermined time period, adjust the location of the transition point based at least in part on the variation value, and operate the engine based on the droop curve.

In another aspect, a system for controlling operation of an engine includes a controller having a processor, memory, and an input/output interface. The processor is configured to determine an operating load of the engine, and control an operating speed of the engine along a first droop curve having a first region that defines a first slope, a second region that defines a second slope different from the first slope, and a transition point located at an intersection of the first region and the second region. The processor is also configured to adjust the location of the transition point based on at least one operating characteristic of the engine to create a second droop curve, and to control the operating speed of the engine along the second droop curve.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the accompanying drawings. The disclosure is capable of supporting other embodiments and of being practiced or of being carried out in various ways.

DETAILED DESCRIPTION

Figure 1:
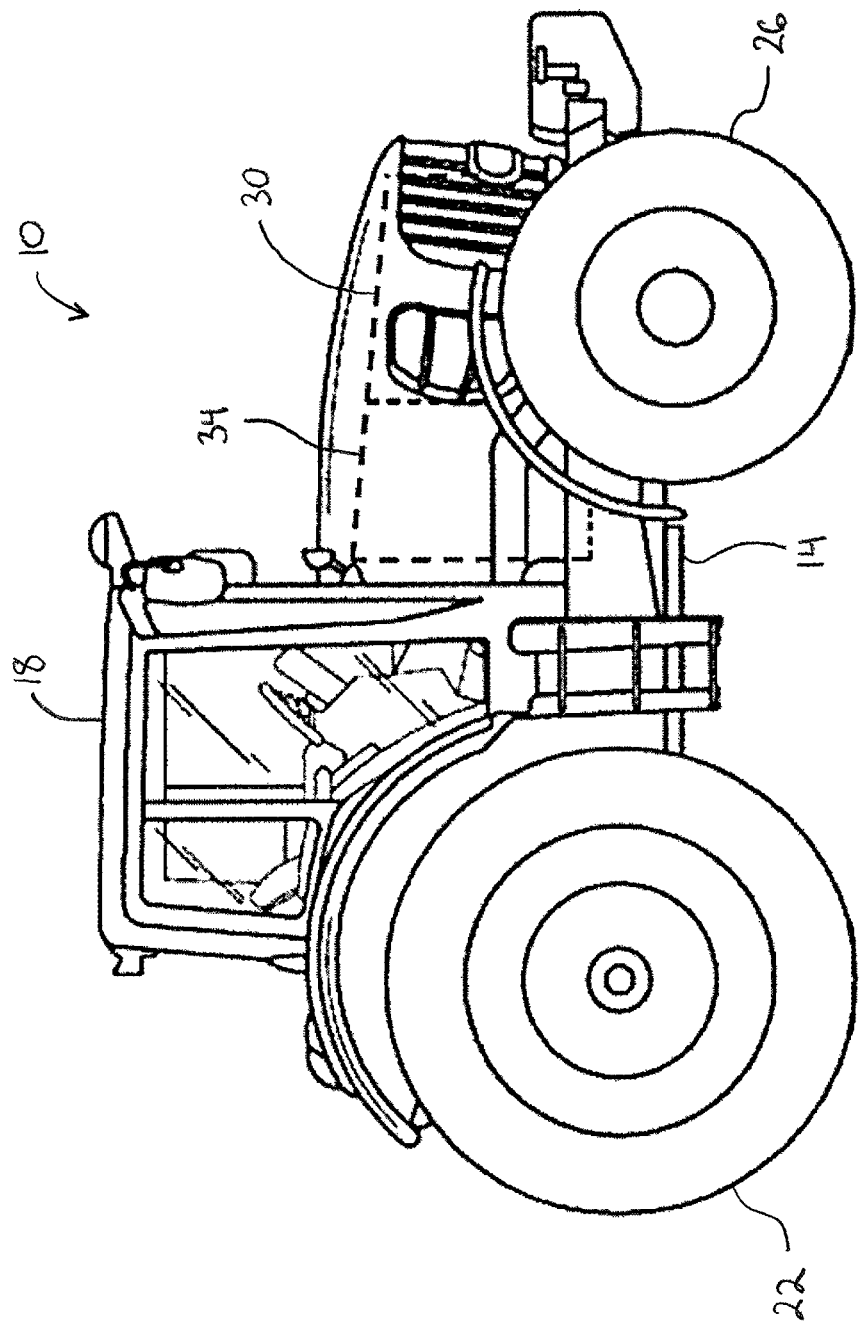
FIG. 1 is a side view of an exemplary machine in which the disclosed system and method for controlling engine operation may be implemented.

FIG. 1 illustrates a machine 10, which is a tractor in the illustrated embodiment. The machine 10 includes a chassis 14, a cab 18, a pair of rear wheels 22, and a pair of front wheels 26. The machine 10 further includes an engine 30 (e.g., an internal combustion engine) supported on the chassis 14. At least one of the pairs of wheels 22, 26 is drivably coupled to the engine 30 via a transmission 34. In some embodiments, the engine 30 may also drive one or more external implements (not shown).

Figure 2:
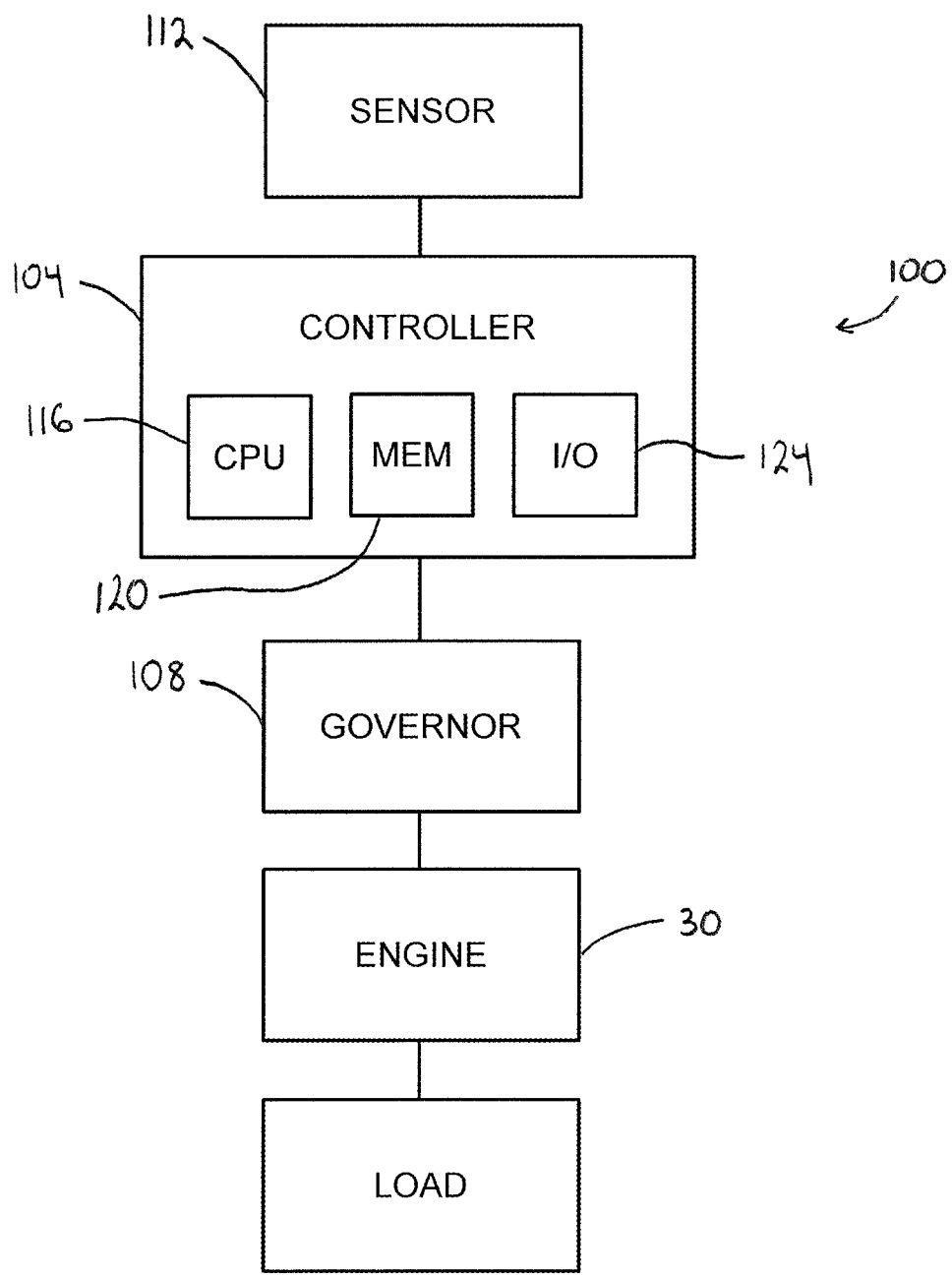
FIG. 2 is a block diagram of an engine control system according to one embodiment of the disclosure.

The machine 10 further includes an engine control system 100 (FIG. 2). It should be understood that the engine control system 100 is not limited in application and can be used in conjunction with any engine or motor. For example, the engine control system 100 can be used in other work vehicles, passenger vehicles, or other equipment powered by an engine or motor (e.g., generators, compressors, pumps, and the like). The illustrated engine control system 100 includes a controller 104, a governor 108, and at least one sensor 112. In some embodiments, the governor 108 may be integrated with the controller 104 and/or the sensor 112 as a single unit.

With continued reference to FIG. 2, the controller 104 includes a plurality of electrical and electronic components that provide power, operational control, and protection to the components and modules within the controller 104. For example, the controller 104 may include an electronic processor or central processing unit 116 (e.g., a programmable microprocessor, microcontroller, or similar device), non-transitory, machine-readable memory 120, and an input/output interface 124. Software included in the implementation of the engine control system 100 can be stored in the memory 120 of the controller 104. The software includes, for example, firmware, one or more applications, program data, filters, rules, one or more program modules, and other executable instructions. The controller 104 is configured to retrieve from memory 120 and execute, among other things, instructions related to the control processes and methods described herein. In other embodiments, the controller 104 may include additional, fewer, or different components.

The controller 104 is communicatively coupled to the governor 108 and the sensor 112 (e.g., via the input/output interface 124). The governor 108 is coupled to the engine 30 to control the operating speed of the engine 30 in response to control signals sent to the governor 108 by the controller 104. The controller 104 may also be configured to communicate with other systems including, for example, other engine controls, emissions systems, and operator controls.

In the illustrated embodiment, the sensor 112 monitors and provides an engine load signal to the controller 104 that is indicative of the load (i.e. torque) on the engine 30. The sensor 112 may be a fuel flow sensor, an airflow sensor, a throttle position sensor, a torque sensor, or any other sensor or combination of sensors capable of measuring the load on the engine 30. In other embodiments, the engine load signal may be based on a commanded fuel flow or throttle position, rather than a measured value. As described in greater detail below, the controller 104 uses the engine load signal to generate a droop curve, such as exemplary droop curves 250, 254, 350, and 354 illustrated in FIGS. 5 and 6. Although the droop curves 250, 254, 350, and 354 are illustrated as plots, the controller 104 may not create such plots. Accordingly, the term "droop curve" as used herein should be understood to also encompass a function, series of functions, or table of values correlating engine speed with engine operating load.

Figure 5:
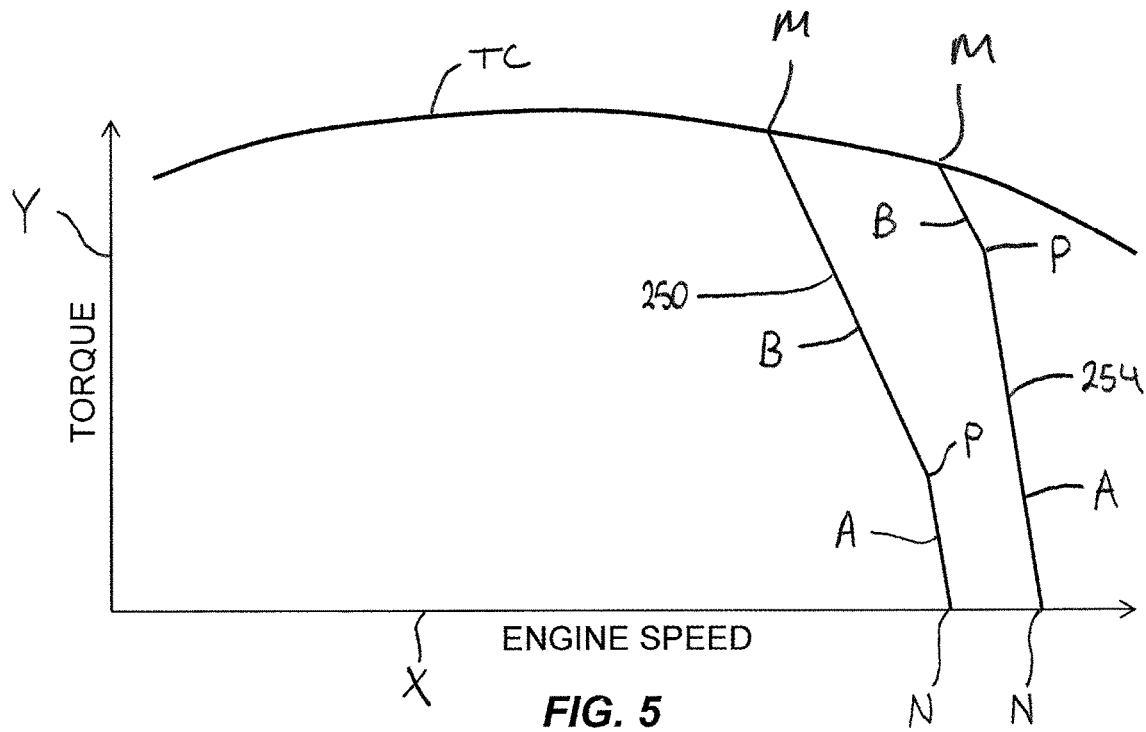
FIG. 5 is a graphical illustration of two droop curves that may be generated by the engine control system of FIG. 2 in response to different average engine loads.
Figure 6:
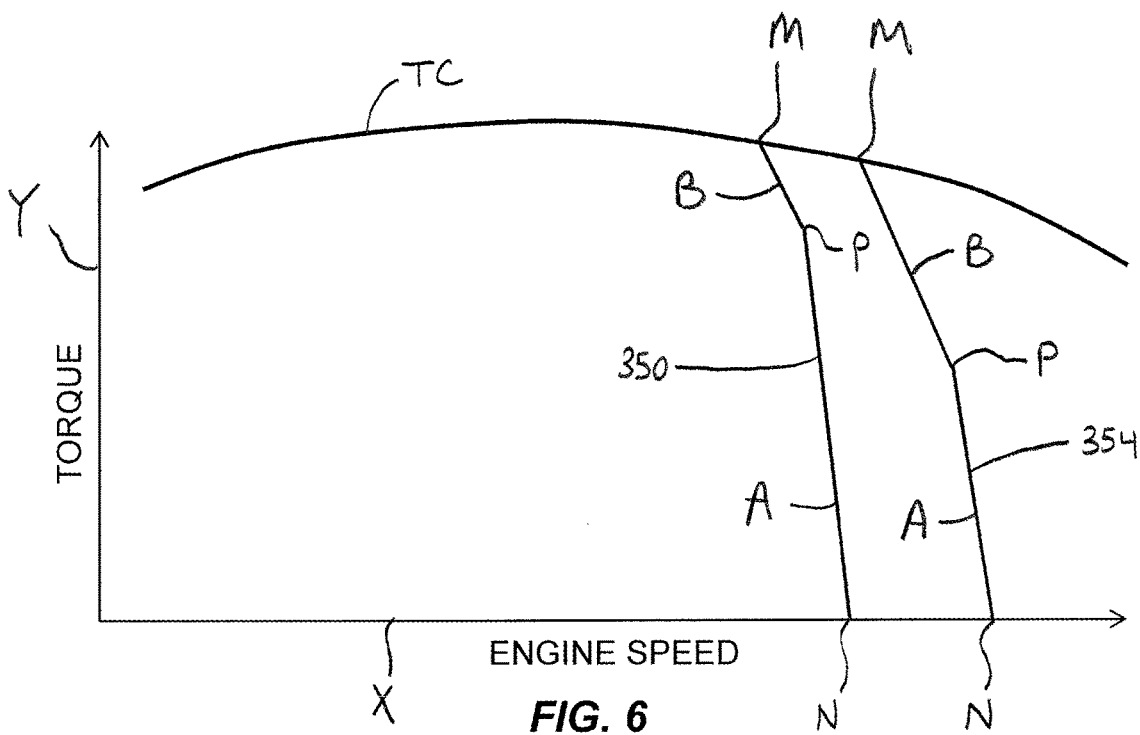
FIG. 6 is a graphical illustration of two droop curves that may be generated by the engine control system of FIG. 2 in response to different engine load variation values.

Referring to FIGS. 5 and 6, each of the droop curves 250, 254, 350, 354 is plotted on an engine map having engine operating speed (e.g., in revolutions per minute or radians per second) on a horizontal axis X and engine operating load or torque (e.g., in foot pounds or newton meters) on a vertical axis Y. The droop curves 250, 254, 350, 354 extend between a torque curve TC of the engine 30, which represents the maximum attainable operating load of the engine 30 across a range of operating speeds, and the horizontal axis X. It should be understood that the positions of the droop curves 250, 254, 350, 354 along the horizontal axis X are merely illustrative, and the positions of the respective droop curves may be set by the operator, the controller 104, or by other means.

Each droop curve 250, 254, 350, 354 includes a first region A defining a first slope, a second region B defining a second slope different from the first slope, and a transition point or breakpoint P located at the intersection of the first region A and the second region B. In the illustrated embodiment, the first region A and the second region B are both linear; however, in other embodiments, one or both of the first region A and the second region B may be nonlinear. In addition, the droop curves 250, 254, 350, 354 may include more than two regions in some embodiments. The second region B intersects the torque curve TC at a maximum operating load point M, and the first region A intersects the horizontal axis 400 at a no-load operating point N.

With continued reference to FIGS. 5 and 6, the illustrated droop curves 250, 254, 350, 354 are all positive droop curves, such that the governor 108 will reduce the engine speed (e.g., by reducing an engine speed set point) as the operating load on the engine 30 increases in both regions A and B. When the engine 30 is operating in the first region A, the governor 108 will reduce the engine speed at a first rate as the operating load increases. When the engine 30 is operating in the second region B, the governor 108 will reduce the engine speed at a second, greater rate as the operating load increases. The two different regions A, B therefore provide the operator with a different feel depending on how much load the engine 30 is experiencing.

Figure 4:
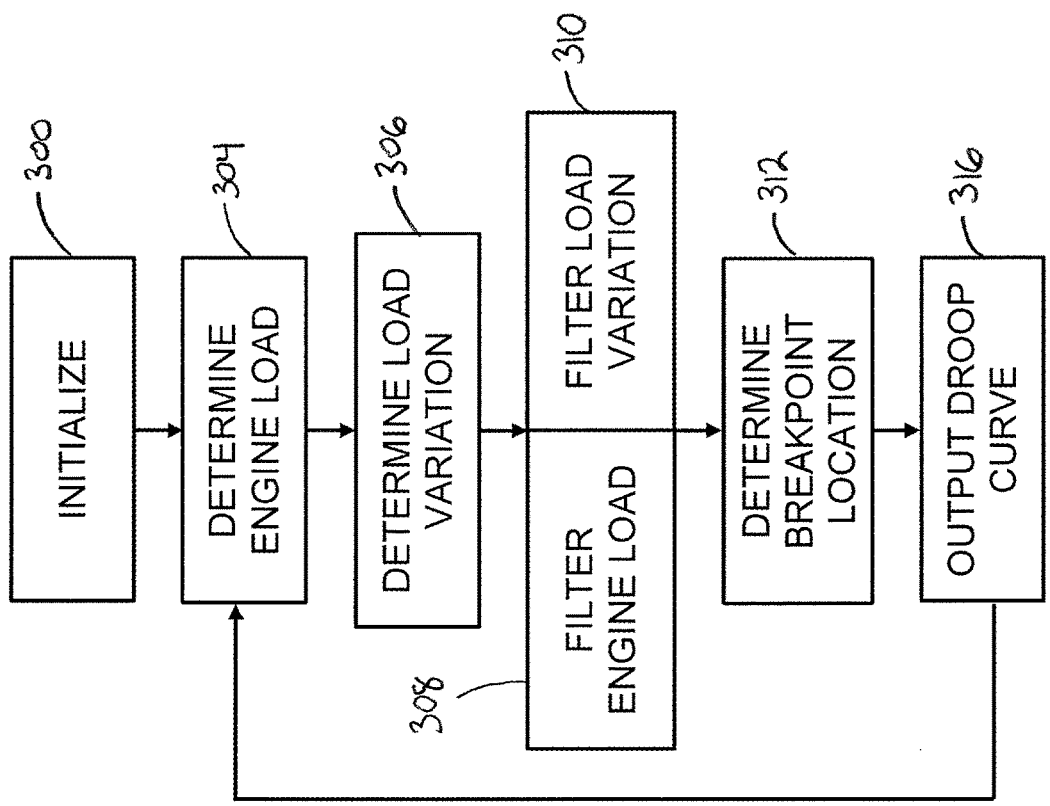
FIG. 4 is a flow chart illustrating another method of operating the engine control system of FIG. 2.
Figure 3:
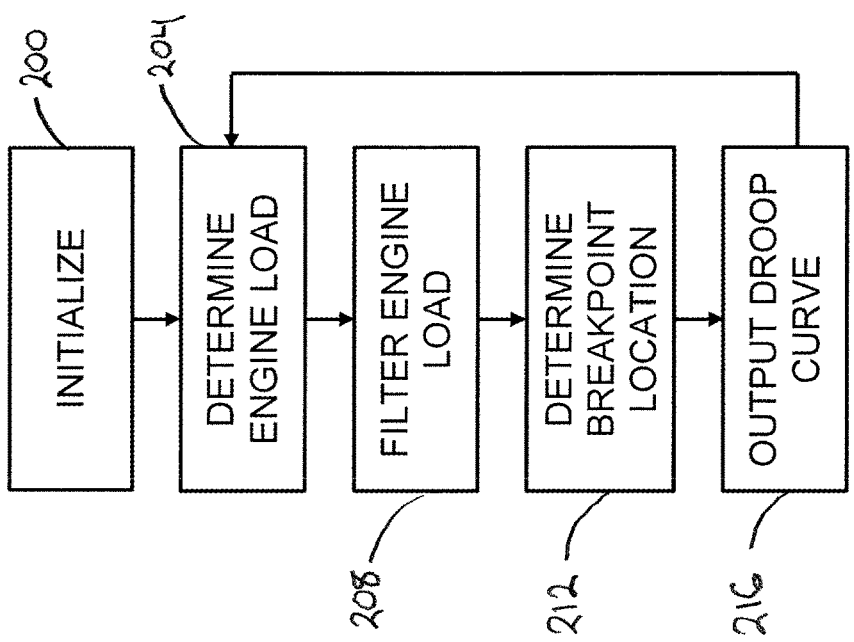
FIG. 3 is a flow chart illustrating a method of operating the engine control system of FIG. 2.

FIGS. 3 and 4 illustrate two methods of operating the controller 104 of the engine control system 100 to generate droop curves, such as the droop curves 250, 254, 350, 354, that may be used to control operation of the governor 108 and, therefore, the engine 30. The methods are referred to herein as a first mode (FIG. 3) and a second mode (FIG. 4). In some embodiments, the controller 104 may toggle between the first mode and the second mode in response to an operator input. In other embodiments, the controller 104 may toggle between the first and second modes automatically in response to one or more sensed operating conditions of the machine 10. Alternatively, the controller 104 may be operable in only one of the first and second modes.

Referring to FIG. 3, in the first mode, the controller 104 begins with an initialize step 200 to set any necessary variables to an appropriate starting value. Next, the controller 104 determines the current operating load $L_n$ on the engine 30 at step 204. In the illustrated embodiment, the current engine operating load $L_n$ is equal to $T_{measured}$ (i.e. the instantaneous measurement of load on the engine 30 based on the engine load signal from the sensor 112) divided by $T_{max}$ (i.e. a maximum attainable operating load of the engine 30 for the current engine operating speed):

$$L_n = \frac{T_{measured}}{T_{max}}$$

The maximum attainable operating load $T_{max}$ is a predetermined value based on the engine's torque curve TC. Accordingly, the current engine operating load $L_n$ has a value ranging from zero to one and may be expressed as a percentage of the maximum attainable operating load $T_{max}$.

Next, the controller 104 filters the current operating load $L_n$ at step 208 to determine the average operating load over a predetermined time period. The controller 104 may filter the operating load using the following equation, where FL is the filtered or average operating load, $FG_L$ is the operating load filter gain, and $L_n$ is the current operating load:

$$FL = FL \cdot FG_L + L_n \cdot (1 - FG_L)$$

The operating load filter gain $FG_L$ may be calculated using the following equation, where t is the averaging period and $\tau$ is a predetermined time constant:

$$FG_L = e^{\left(\frac{-t}{\tau}\right)}$$

Figure 7:
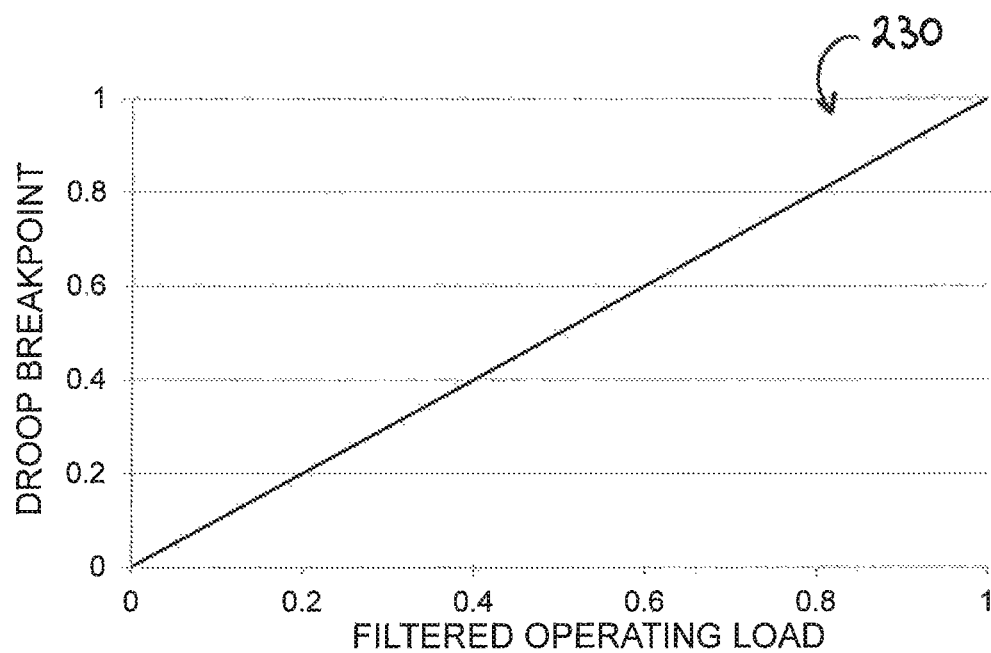
FIG. 7 illustrates a correlation between breakpoint location and engine operating load for a droop curve generated by the engine control system of FIG. 2.

The controller 104 uses the filtered operating load FL to determine the location of the breakpoint P at step 212. In the illustrated embodiment, the controller 104 determines the location of the breakpoint P based on a directly proportional relationship 230 with the filtered operating load FL (FIG. 7). As the filtered operating load FL increases, the location of the breakpoint P is set closer to the torque curve TC. For example, for a filtered operating load of 0.4, the breakpoint P is set at 0.4 (i.e. 40% of the maximum attainable operating load $T_{max}$). Alternatively, the controller 104 may look up the location of the breakpoint P using a lookup table or may calculate the location of the breakpoint P as a function of the filtered operating load FL.

Referring again to FIG. 3, the controller 104 generates a droop curve (e.g., droop curve 250 in FIG. 5) at step 216, with the breakpoint P located as determined in step 212. The controller 104 may also calculate the slopes of the first region A and the second region B based on the current operating speed, operating load, or other engine operating characteristics. Accordingly, the point M where the droop curve 250 intersects the torque curve TC, and the point N where the droop curve 250 intersects the zero torque line X may be adjusted to minimize the effect changing the location of the breakpoint P may have on the current operating speed of the engine 30. The controller 104 communicates with the governor 108 to operate the engine 30 along the generated droop curve. The controller 104 then loops to step 204 after a predetermined time period to repeat the process and adjust the location of the breakpoint P in response to any changes in the filtered operating load FL. In other embodiments, the controller 104 may adjust the location of the breakpoint P continuously.

Thus, when operating in the first mode (FIG. 3), the controller 104 sets the breakpoint P relatively close to the torque curve TC (e.g., droop curve 254 in FIG. 5) when the engine 30 experiences relatively high average load. This provides increased engine power for demanding load conditions while still allowing the operator to feel when engine operation enters the second region B and approaches the torque curve TC. When the average load on the engine 30 decreases, the controller 104 sets the breakpoint P further from the torque curve TC (e.g., droop curve 250 in FIG. 5).

The second operating mode of the controller 104 will now be described with reference to FIG. 4. The second mode is similar to the first mode, and the following description focuses only on the differences between the second mode and the first mode described above. In addition, operational steps in the second mode corresponding with operational steps in the first mode are given like reference numbers, plus 100.

In the second mode, the controller 104 begins with an initialize step 300 to set any necessary variables to an appropriate starting value. The controller 104 then determines the current operating load $L_n$ on the engine 30 at step 304. Next, at step 306, the controller 104 determines the amount of load variation LV between the current operating load $L_n$ and the previous operating load $L_{n-1}$, according to the following equation:

$$LV = |L_n - L_{n-1}|$$

The controller 104 filters the current operating load $L_n$ at step 308 to determine the average operating load over a predetermined time period. Similarly, the controller filters the load variation LV at step 310 to determine the average load variation over a predetermined time period, which may be the same or different from the predetermined time period used to determine the filtered load FL. The controller 104 may filter the load variation LV using the following equation, where FLV is the filtered or average load variation, $FG_{LV}$ is the load variation filter gain, and LV is the current load variation:

$$FLV = FLV*FG_{LV} + LV*(1-FG_{LV})$$

The load variation filter gain $FG_{LV}$ may be calculated using the following equation, where t is the averaging period and τ is a predetermined time constant:

$$FG_{LV} = e^{\left(\frac{-t}{\tau}\right)}$$

Figure 8:
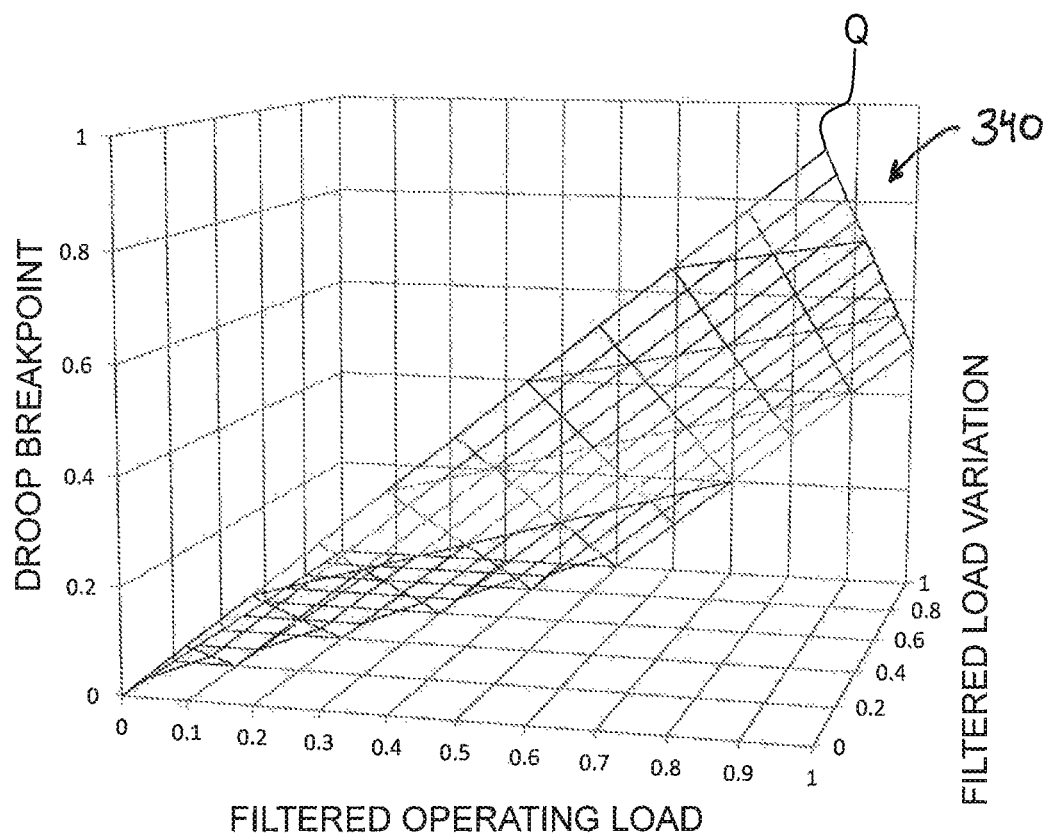
FIG. 8 illustrates a correlation between breakpoint location, engine operating load, and load variation for a droop curve generated by the engine control system of FIG. 2.

In the illustrated embodiment, the controller 104 uses both the filtered operating load FL and the filtered load variation FLV to determine the location of the breakpoint P at step 312. In the illustrated embodiment, the controller 104 determines the location of the breakpoint P based on a surface plot 340 (FIG. 8). As the filtered operating load FL increases, the location of the breakpoint P is set closer to the torque curve TC (FIG. 6). As the filtered load variation FLV increases, the location of the breakpoint P is set further from the torque curve TC. Thus, the location of the breakpoint P is determined based on a balance between the filtered operating load FL and the filtered load variation FLV. For example, in FIG. 8, the location of the breakpoint P is set at a point closest to the torque curve TC when the filtered operating load is at its maximum and the filtered load variation is at its minimum. This is represented on the surface plot 340 as point Q. The location of the breakpoint P is set further from the torque curve TC with either or both increased load variation and decreased average load. In other embodiments, the controller 104 may look up the location of the breakpoint P using a lookup table or may calculate the location of the breakpoint P as a function of the filtered operating load FL and the filtered load variation FLV. Alternatively, the location of the breakpoint P may be determined based solely on the filtered load variation FLV.

Referring again to FIG. 4, the controller 104 generates a droop curve (e.g., droop curve 350 in FIG. 6) at step 316, with the breakpoint P located as determined in step 312. The controller 104 may also calculate the slopes of the first region A and the second region B based on the current operating speed, operating load, or other engine operating characteristics. The controller 104 communicates with the governor 108 to operate the engine 30 along the generated droop curve 350. The controller 104 then loops to step 304 after a predetermined time period to repeat the process and adjust the location of the breakpoint P in response to any changes in the filtered operating load FL and/or the filtered load variation FLV. In other embodiments, the controller 104 may adjust the location of the breakpoint P continuously.

Thus, when operating in the second mode (FIG. 4), the controller 104 sets the breakpoint P further from the torque curve TC (e.g., droop curve 354 in FIG. 6) when the engine 30 experiences relatively high load variation. This provides the operator with increased feedback of the amount of load on the engine 30, giving the operator time to downshift or take other appropriate correction as the load on the engine approaches the torque curve TC. When the engine 30 experiences relatively low load variation, the controller 104 sets the breakpoint P closer to the torque curve TC (e.g., droop curve 350 in FIG. 6) to minimize variations in engine speed resulting from minor load changes.

Various features of the disclosure are set forth in the following claims.

What is claimed is:

1. A machine comprising:
    an engine;
    a governor operable to control an operating speed of the engine along a first droop curve such that the operating speed is a function of an operating load of the engine, the first droop curve including
        a first region that defines a first slope,
        a second region that defines a second slope different from the first slope, and a transition point located at an intersection of the first region and the second region; and a controller in communication with the governor, the controller configured to determine an average operating load of the engine over a predetermined time period, adjust the location of the transition point based at least in part on the average operating load to create a second droop curve, and operate the engine based on the second droop curve, wherein the controller is configured to move the transition point based on a proportional relationship with the average operating load.

2. The machine of claim 1, wherein the governor is operable to decrease the operating speed at a first rate as the operating load increases in the first region.

3. The machine of claim 2, wherein the governor is operable to decrease the operating speed at a second rate as the operating load increases in the second region.

4. The machine of claim 3, wherein the second rate is greater than the first rate.

5. The machine of claim 1, wherein the controller is configured to move the transition point closer to a maximum attainable operating load of the engine when the average operating load increases.

6. The machine of claim 1, wherein the controller is configured to move the transition point further from a maximum attainable operating load of the engine when the average operating load decreases.

7. The machine of claim 1, wherein the controller is configured to determine a variation value based on variation of the operating load over a second predetermined time period.

8. The machine of claim 7, wherein the controller is configured to adjust the location of the transition point based on both the average operating load and the variation value.

9. The machine of claim 8, wherein the controller is configured to move the transition point closer to a maximum attainable operating load of the engine when the variation value decreases.

10. The machine of claim 8, wherein the controller is configured to move the transition point further from a maximum attainable operating load of the engine when the variation value increases.

11. The machine of claim 1, further comprising a sensor in communication with the controller, the sensor configured to provide feedback to the controller indicative of the operating load of the engine.

12. The machine of claim 1, wherein the first region is linear.

13. The machine of claim 1, wherein the second region is linear.

14. A system for controlling operation of an engine, the system comprising:

a controller including a processor, memory, and an input/output interface, the processor configured to:

determine an average operating load of the engine, control an operating speed of the engine along a first droop curve having a first region that defines a first slope, a second region that defines a second slope different from the first slope, and a transition point located at an intersection of the first region and the second region, adjust the location of the transition point based at least in part on the average operating load of the engine to create a second droop curve, and control the operating speed of the engine along the second droop curve, wherein the processor is configured to move the transition point closer to a maximum attainable operating load of the engine when the average operating load increases and to move the transition point further from the maximum attainable operating load of the engine when the average operating load decreases, and wherein the processor is configured to move the transition point based on a proportional relationship with the average operating load.

15. The system of claim 14, wherein the processor is configured to determine a variation value based on variation of the operating load over a time period.

16. The system of claim 15, wherein the processor is configured to adjust the location of the transition point based on both the average operating load and the variation value.

17. The system of claim 16, wherein the processor is configured to move the transition point closer to a maximum attainable operating load of the engine when the variation value decreases and to move the transition point further from the maximum attainable operating load of the engine when the variation value increases.

* * * * *